United States Patent
Murao et al.

(10) Patent No.: US 10,887,512 B2
(45) Date of Patent: Jan. 5, 2021

(54) CAMERA SYSTEM

(71) Applicant: DENSO CORPORATION, Kariya (JP)

(72) Inventors: Toshikazu Murao, Kariya (JP);
Nobuhisa Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 53 days.

(21) Appl. No.: 16/201,079

(22) Filed: Nov. 27, 2018

(65) Prior Publication Data
US 2019/0166307 A1 May 30, 2019

(30) Foreign Application Priority Data

Nov. 29, 2017 (JP) .................. 2017-229425

(51) Int. Cl.
*H04N 5/232* (2006.01)
*H04N 5/225* (2006.01)

(52) U.S. Cl.
CPC ....... *H04N 5/23232* (2013.01); *H04N 5/2258* (2013.01); *H04N 5/23227* (2018.08)

(58) Field of Classification Search
CPC ........... H04N 5/23232; H04N 5/23227; H04N 5/2258; H04N 5/3532
See application file for complete search history.

(56) References Cited

U.S. PATENT DOCUMENTS

| | | |
|---|---|---|
| 2012/0155855 A1 | 6/2012 | Okuda |
| 2012/0207461 A1 | 8/2012 | Okuda |
| 2014/0016919 A1 | 1/2014 | Okuda |
| 2015/0293328 A1* | 10/2015 | Laroia ................ G02B 13/0065 348/369 |
| 2016/0039358 A1 | 2/2016 | Okuda et al. |
| 2017/0305361 A1 | 10/2017 | Okuda et al. |

FOREIGN PATENT DOCUMENTS

JP 5316562 B2 10/2013

\* cited by examiner

*Primary Examiner* — Twyler L Haskins
*Assistant Examiner* — Angel L Garces-Rivera
(74) *Attorney, Agent, or Firm* — Maschoff Brennan (57) ABSTRACT

A camera system includes: a first imaging element; a second imaging element different from the first imaging element; an oscillator for supplying a clock signal to the first imaging element and the second imaging element; and a controller that controls an operation of the first imaging element and an operation of the second imaging element, and acquires image signals outputted by the first imaging element and the second imaging element. The controller synchronizes and outputs image data of a first region, which is a part of an effective pixel region of the first imaging element, and image data of a second region, which is a part or a whole of an effective pixel region of the second imaging element.

9 Claims, 6 Drawing Sheets

IMAGE OF 1ST IM ELE

IMAGE OF 2ND IM ELE

CAMERA SYSTEM

CROSS REFERENCE TO RELATED APPLICATION

The present application claims the benefit of priority from Japanese Patent Application No. 2017-229425 filed on Nov. 29, 2017. The entire disclosure of the above application is incorporated herein by reference.

TECHNICAL FIELD

The present disclosure relates to relates to a camera system.

BACKGROUND

Conventionally, a camera module that is mounted on the inside of a windshield in a vehicle and is configured to photograph the outside of the vehicle is well known.

SUMMARY

A camera system includes: a first imaging element; a second imaging element; an oscillator; and a controller configured to control an operation of the first imaging element and an operation of the second imaging element and to obtain a first signal from the first imaging element and a second signal from the second imaging element. The controller synchronously outputs a first image data corresponding to a first region as a part of an effective pixel region of the first imaging element and a second image data corresponding to a second region as a part of or a whole of an effective pixel region of the second imaging element.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

In order to support advanced driving assistance or autonomous driving of a vehicle, camera systems are required to capture images of a wide range of the outside so as to recognize images. That is, in the camera system, a lens having a relatively wide angle is used for a lens corresponding to a predetermined imaging element. However, when a wide view angle is secured by using a wide angle lens, the resolution is relatively low in a region with a small view angle, which is a part of the wide view angle. Since the accuracy of image analysis in driving support depends on the resolution of the image, it is desirable that the resolution of the image to be acquired in the camera system is as high as possible.

Therefore, although it can be considered to adopt an imaging element having a large number of pixels. In such a case, a frame rate may decrease, or a cell size per pixel may decrease, and due to these decreasing, sensitivity may decrease. Thus, in the driving support system required for real-time analysis regardless of day or night, this trade-off relationship may be a bottleneck difficulty.

In order to cope with this difficulty, it is considered to provide a compound eye camera system including an imaging element for shooting a wide angle range and an imaging element for shooting a telephoto image, and the imaging elements have a wide-angle lens and a telephoto lens, respectively.

In the camera system having such a configuration, image data are respectively acquired by a plurality of imaging elements. In the advanced driving support or autonomous driving of the vehicle, image analysis in real time is necessary, and image acquisition at the same time is also required.

In addition, since the number of imaging elements is two or more, wirings for interconnection with a processor or the like are increased compared with a case where the system includes only one imaging element.

Therefore, a camera system is provided to be capable of reducing the number of signal lines while achieving simultaneity of photographing between multiple imaging elements in a compound eye camera system using a plurality of imaging elements.

A camera system includes: a first imaging element; a second imaging element separated from the first imaging element; an oscillator configured to supplying a clock signal to the first imaging element and the second imaging element; and a controller configured to control an operation of the first imaging element and an operation of the second imaging element and to obtain a first signal from the first imaging element and a second signal from the second imaging element. The controller synchronously outputs a first image data corresponding to a first region as a part of an effective pixel region of the first imaging element and a second image data corresponding to a second region as a part of or a whole of an effective pixel region of the second imaging element.

According to the above system, since two independent image data can be output synchronously, simultaneity of image acquisition can be secured. In addition, since the two images can be analyzed at the same time without any time difference during the movement of the vehicle, it is possible to cope with instantaneous situation changes during autonomous driving operation.

Furthermore, when the oscillator supplies a common clock signal to the first imaging element and the second imaging element, the first imaging element and the second imaging element can be driven by one oscillator, and therefore, the number of wirings can be reduced.

Hereinafter, embodiments for implementing the present disclosure will be described referring to drawings. In each embodiment, portions corresponding to the elements described in the preceding embodiments are denoted by the same reference numerals, and redundant explanation may be omitted. When only a part of a configuration is described in an embodiment, another preceding embodiment may be applied to the other parts of the configuration. It may be possible not only to combine parts, the combination of which is explicitly described in an embodiment, but also to combine parts of respective embodiments, the combination of which is not explicitly described, if any obstacle does not especially occur in combining the parts of the respective embodiments.

First Embodiment

First, with reference to FIG. 1 and FIG. 2, a schematic configuration of a camera system according to this embodiment will be described.

The camera system according to the present embodiment is, for example, installed inside the windshield of the vehicle (i.e., inside the compartment) and is a system that acquires at least the image ahead of the vehicle as electronic data. The acquired image data is analyzed as a traffic situation data ahead of the vehicle and used for various systems such as autonomous driving function and a pedestrian recognition function.

Figure 1:
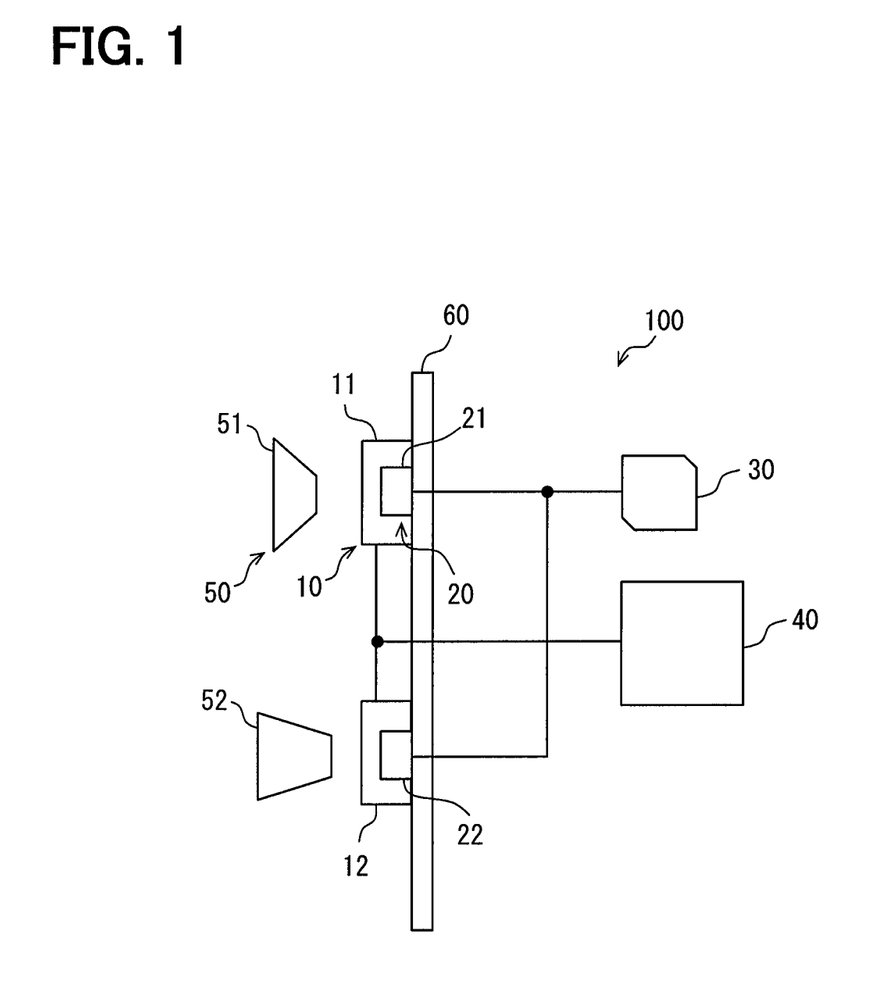
FIG. 1 is a block diagram showing a schematic configuration of a camera system according to a first embodiment.

As shown in FIG. 1, a camera system 100 according to the present embodiment includes a first imaging element 11 and a second imaging element 12 as the imaging elements 10. A phase synchronization circuit or a phase locked loop (i.e., PLL) 20 is arranged in each of the first imaging element 11 and the second imaging element 12. In addition, the camera system 100 includes an oscillator 30 and a controller 40 as a processor. Furthermore, the lens 50 is provided with a first lens 51 for forming an image on the first imaging element 11 and a second lens 51 for forming an image on the second imaging element 12.

The imaging element 10 is an element that converts light into electric signals by photoelectric conversion, and the imaging element 10 is, for example, a CCD or a CMOS image sensor. As in the present embodiment, when mounted on a vehicle and it is necessary to process video images in real time, it is preferable that the frame rate is high, and in this respect, it is preferable to adopt a CMOS image sensor. In the imaging surface of the imaging element 10, pixels are arranged in a two-dimensional matrix, and receive external light in color or monochrome and convert the light into electric charges.

When adopting a CMOS image sensor as the imaging element 10, the imaging element 10 has a horizontal scanning circuit and a vertical scanning circuit (not shown), so that it is possible to select a column and a row of pixels, and to perform random access to the pixels. That is, the controller 40 described later can arbitrarily acquire the voltage of a certain pixel.

The light receiving surface of the imaging element 10 includes an effective pixel on which light is incident, an optical black (OB) pixel that defines a reference voltage in darkness by being shielded from light, and a dummy pixel excluding the effective pixels and the OB pixels. The sum of these pixels is defined as the total number of pixels, and the sum of the effective pixels is defined as the effective pixel number.

The camera system 100 according to the present embodiment has two imaging elements of a first imaging element 11 and a second imaging element 12. For example, the first imaging element 11 and the second imaging element 12 may have different specifications in which the total number of pixels, the size of the package, the spectral characteristics of the color filter, the condensing characteristics of microlenses provided for each pixel, and the like are different from each other. In the present embodiment, the first imaging element 11 and the second imaging element 12 are formed by a same type of the elements having the same specification.

The first imaging element 11 is, for example, a ¼ type CMOS image sensor with a predetermined total number of pixels. The first lens 51 for forming an image on the first imaging element 11 is, for example, a so-called single focal-length wide-angle lens having a focal length of about 3 mm to 8 mm. The whole of the view angle of the first lens 51 forms an image on the whole of the effective pixels of the first imaging element 11. The camera system 100 obtains information on the surrounding land feature, traffic signals, structures, etc. by analyzing the wide angle image captured by the first imaging element 11. Then, the autonomous driving function is realized by analyzing the information together with the satellite positioning system, map information and the like.

The second imaging element 12 is a CMOS image sensor having the same specification as the first imaging element 11. The second lens 52 for forming an image on the second imaging element 12 is, for example, a single focus lens having a focal length of about 8 mm to 30 mm. The second lens 52 is arranged so that its entire view angle forms an image on the entire effective pixels of the second imaging element 12, and the second lens 52 forms a telephoto image compared to the first lens 51.

As shown in FIG. 1, the first imaging element 11 and the second imaging element 12 are mounted on the same surface of the circuit board 60 so as to face the same direction. Along with this configuration, the first lens 51 and the second lens 52 are also oriented so that the optical axes are parallel to each other and the landscape in the same direction can be photographed. The first lens 51 and the second lens 52 are fixed to a mount (not shown) provided on the circuit board 60. The second lens 52 has a telephoto specification as compared with the first lens 51, and as shown in FIG. 2, the view angle of imaged by the second imaging element 12 is equal to the view angle of the predetermined center portion of the image picked up by the first imaging element 11. The center portion is cut out from the image of the first imaging element 11. A portion of the effective pixel region of the first imaging element 11 as the portion corresponding to the view angle of the second imaging element 12 and cut off from the image of the first imaging element 11 is referred to as a first region R1.

Also, a portion of the effective pixel region of the second imaging element 12 as the portion corresponding to the view angle of the first imaging element 11 and cut off from the image of the second imaging element 12 is referred to as a second region R2. In the present embodiment, the aspect ratios of the first region R1 and the second region R2 are the same, and the second region R2 matches the entire effective pixel region of the second imaging element 12.

Figure 2:
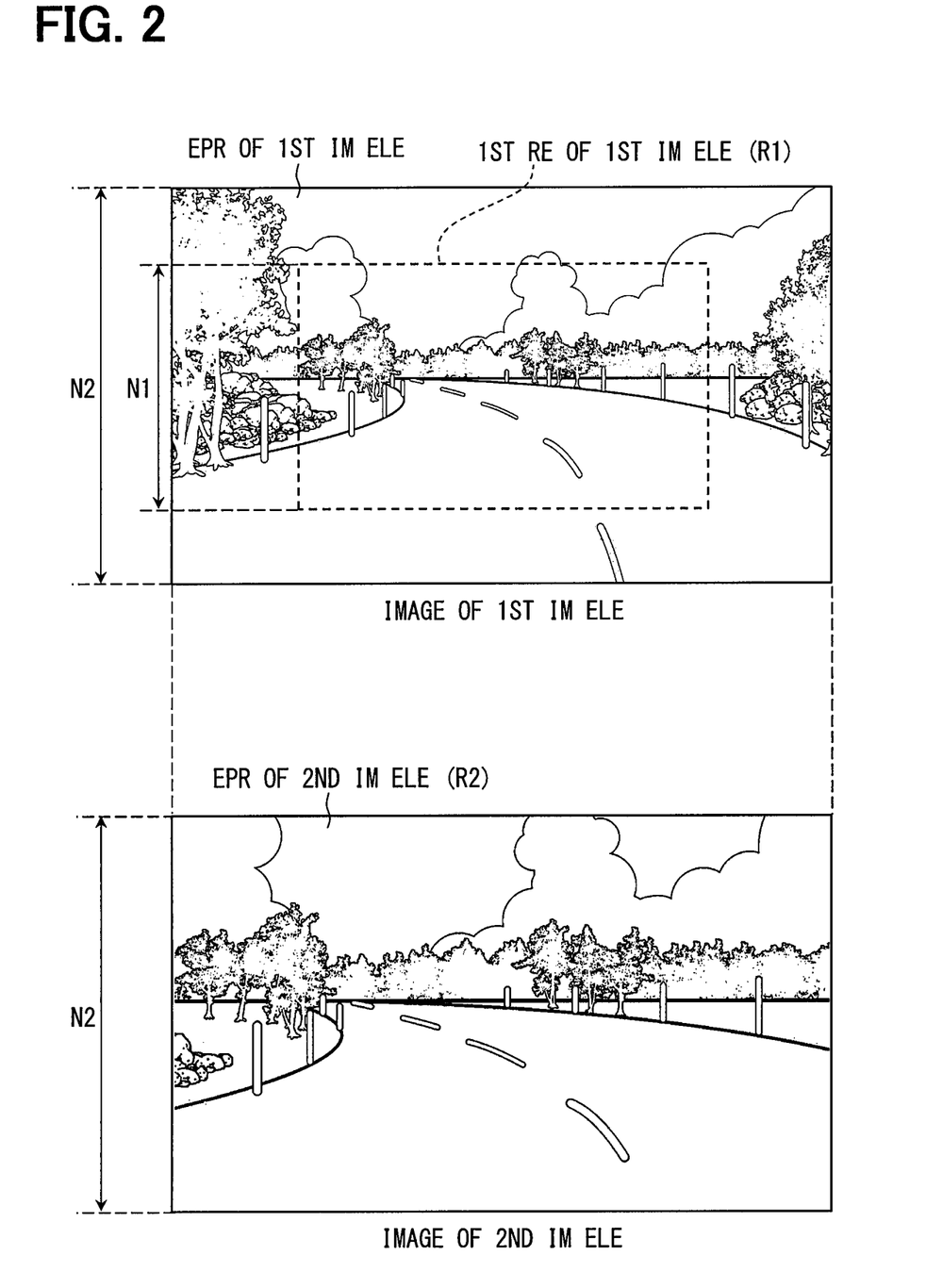
FIG. 2 is a diagram showing a view angle of images photographed by a first imaging element and a second imaging element; 5

As shown in FIG. 2, when the number of lines in the V direction of the first region R1 is defined as N1, and the number of lines in the V direction of the second region R2 is defined as N2 (N2 is equal to the number of pixels in the V direction), the equation of N1<N2 is established. The same view angle as the first region R1 is imaged in the second region R2. Since the relationship of N1<N2 is satisfied, the second region R2 has higher resolution than the first region R1.

The phase locked loop (i.e., PLL) 20 is a generally known PLL, and has, for example, a phase comparator (not shown), a low pass filter, a voltage controlled oscillator, and a frequency divider, and performs a negative feedback of an output signal from the voltage controlled oscillator to the phase comparator. The PLL 20 is arranged inside the imaging element 10, and functions to conform the phase of the input signal to the phase of the output signal. Specifically, the PLL 20 functions to match the clock signal supplied by the oscillator 31 (to be described later) with the operation clock in the imaging element 10. The PLL 20 includes a first PLL 21 and a second PLL 22 which are integrally incorporated in the first imaging element 11. It should be noted that the first PLL 21 and the second PLL 22 are equivalent to each other, and the clock signal to be output upon receiving the reference clock signal inputted from the oscillator 30 described later is the same for the first imaging element 11 and the second imaging element 12.

The oscillator 30 generates a reference clock signal of the camera system 100 using, for example, a crystal oscillator. The oscillator 30 outputs a clock signal to the first PLL 21 formed in the first imaging element 11. As a result, the first PLL 21 generates a clock signal inside the first imaging element 11. Similarly, the oscillator 30 outputs a clock signal to the second PLL 22 formed in the second imaging element 12, and the second PLL 22 generates a clock signal inside the second imaging element 12. That is, the oscillator 30 outputs a common clock signal to the first imaging element 11 and the second imaging element 12.

The controller 40 is a processor, and executes the control of the first imaging element 11 and the second imaging element 12. Specifically, the controller 40 adjusts the timing of the electronic shutter of the pixel to control the exposure time, selects the read-out line, executes to select a row and a column of the pixel corresponding to the selected read-out line, and controls the imaging device 10 to acquire a desired image.

Further, the controller 40 performs processing of image data input from the imaging device 10 via AFE (not shown). In the present embodiment, the controller as a processor and the processing unit as an image analysis unit are illustrated as an integrated controller 40 in FIG. 1. Alternatively, these may be independently arranged in the controller 40. That is, a dedicated processor such as a GPU may be used for image analysis.

The controller 40, the first imaging element 11, and the second imaging element 12 are mutually connected by a bus. In particular, in the present embodiment, the bus connecting the controller 40, the first imaging element 11, and the second imaging element 12 is a serial bus. For example, the bus may be I²C. Alternatively, a bus other than I²C capable of serial communication may be also adopted.

Note that the wire connecting the oscillator 30 and the controller 40, or the wire connecting the oscillator 30 and the imaging element 10 in a communicable manner, and the wiring connecting the controller 40 and the imaging element 10 may be mounted on the circuit board 60 on which the imaging element 10 is disposed. Alternatively, the wires may be disposed on another substrate or in another module.

Next, the drive operation of the first imaging element 11 and the second imaging element 12 by the controller 40 will be described with reference to FIG. 3. It is to be noted that the controller 40 will be described as an example in which the first imaging element 11 and the second imaging element 12 are driven in a focal plane shutter (rolling shutter drive) operation by the controller 40.

Figure 3:
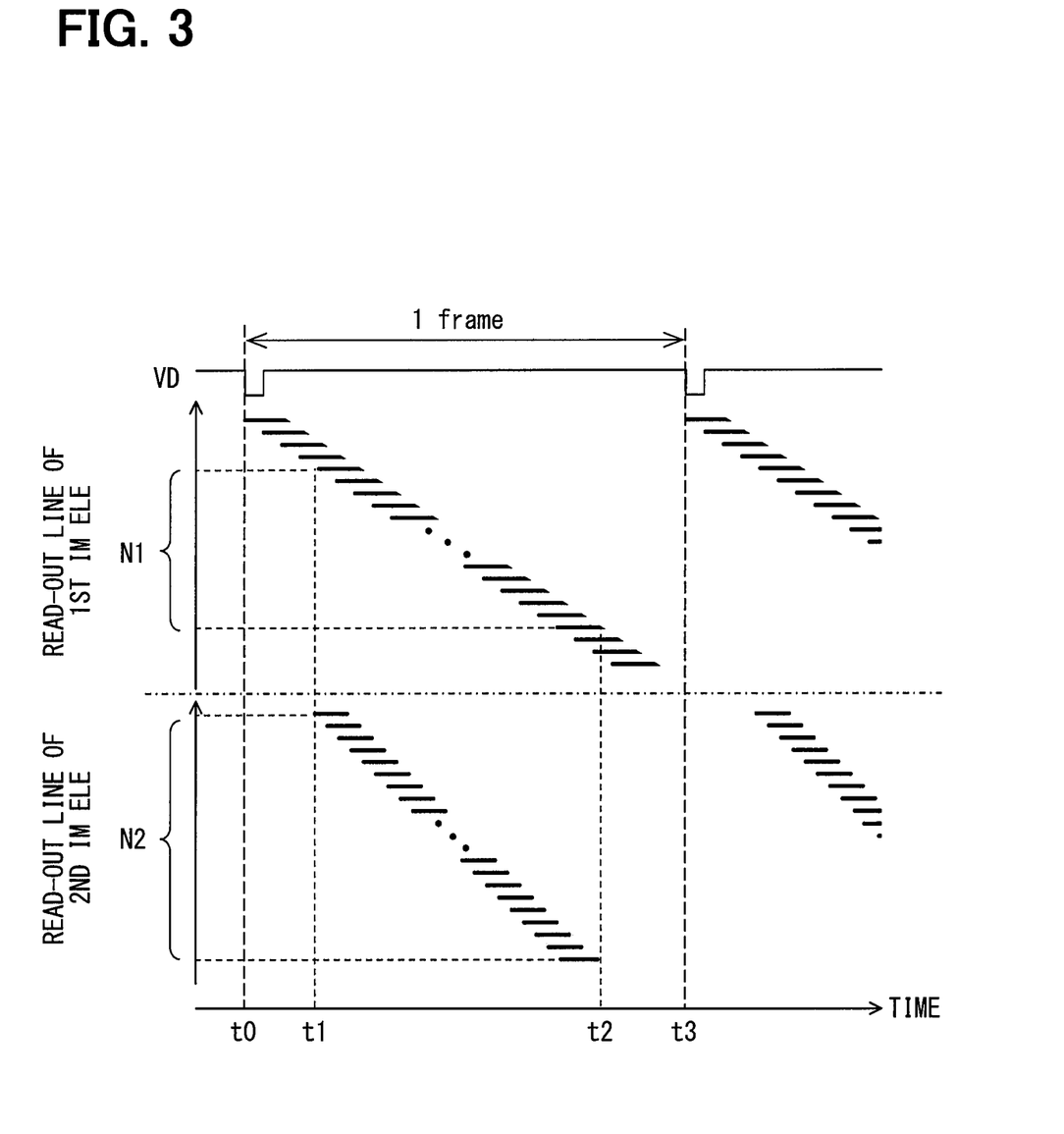
FIG. 3 is a diagram showing a relationship between read-out lines and time.

The time from the time t0 to the time t3 shown in FIG. 3 is the time interval for obtaining one frame, and the controller 40 periodically repeats this one frame per unit time by a predetermined number of numerical times. As a result, the camera system 100 can capture moving images.

The controller 40 starts reading the first line of the effective pixels of the first imaging element 11 at time to. Then, at time t1, the first read-out line of the first region R1 is read out. Thereafter, at the time t2, the read-out of the last read-out line of the first region R1 is completed. That is, the N 1 line is read out for the time interval of (t2−t1). In the first imaging element 11, the read-out of the remaining read-out lines is continued thereafter, and one frame on the wide angle side is acquired by the controller 40.

On the other hand, the controller 40 operates the second imaging element 12 such that the second imaging element 12 is disposed in a blanking period, in which the read-out of the read-out line of the effective pixel region of the second imaging element 12 is not performed, from time t0 to time t1. That is, the period from the time t0 to the time t1 is a period in which image data does not exist even within one frame. The controller 40 starts reading out the first line of the effective pixels of the second imaging element 12 at time t1 at which the read-out of the first region R1 is started in the first imaging element 11. That is, the read-out of the second region R2 is started. Thereafter, at the time t2 which is the same as the completion of the read-out of the first region R1, the read-out of the last read-out line of the second region R2 is completed. That is, the read-out of all the lines of the effective pixel region of the second imaging element 12 is completed, and the N2 line is read out for the time interval of (t2−t1). After the time t2, the blanking period starts until the read-out start time t3 of the next frame.

In order to realize the above operation, the controller 40 drives the second imaging element 12 such that the read-out speed of the second imaging element 12 is set to a value obtained by multiplying the read-out speed by N2/N1 times. The exposure time per line is set to be the same for the first imaging element 11 and the second imaging element 12.

Next, effects obtained by adopting the camera system 100 according to the present embodiment will be described.

As described above, during the period from the time t1 to the time t2, the controller 40 reads out the first region R1 in the first imaging element 11 and also the second region R2 having the same view angle as the first region R1 in the same period. That is, the first region R1 and the second region R2 can be read out synchronously. Therefore, since the image processing can be executed using the image data (in the image signal) of the second region R2 which is higher in resolution than the first region R1, for example, the resolution when photographing a telephoto image is increased, compared with a case where the wide angle side is photographed using a single imaging element, and the telephoto image for the image processing is obtained by trimming. Therefore, it is possible to maintain high accuracy even for the image processing on the telephoto image side.

It should be noted that the start time of the read-out of the second region R2 is not always necessarily required to coincide with the start time (at time t1) of the read-out of the first region R1. In addition, the end time of the read-out of the second region R2 does not necessarily coincide with the end time (time t2) of the read-out of the first region R1. When the read-out of the first region R1 and the second region R2 is completed within one frame, two image data of the wide angle image and the telephoto image can be obtained synchronously in one frame.

Particularly in the focal plane shutter-driven CMOS sensor, it is preferable that the start time of the read-out of the second region R2 and the start time of the read-out of the first region R1 may coincide with each other as in this embodiment. According to this, since the start time of the exposure can be matched between the first region R1 and the second region R2, the simultaneity can be secured between the two imaging elements 10 and the distortion of the image attributed to the focal plane shutter can be reduced.

Furthermore, in the present embodiment, since the number of lines to be read out in the second region R2 is N2/N1 times larger than the first region R1, the controller 40 sets the read-out speed of the second imaging element 12 to be N2/N1 times larger than the first imaging element 11, so that the end time of the read-out in the second region R2 and the end time of the read-out in the first region R1 can be matched. As a result, the start time of the exposure and the end time of the exposure can be matched between the first region R1 and the second region R2, so that simultaneity can be secured between the two imaging elements 10.

Furthermore, in the camera system 100 according to the present embodiment, a common clock signal is input to both the first imaging element 11 and the second imaging element 12 by one oscillator 30. Therefore, the number of wirings and the wiring length can be reduced as compared with a configuration in which clock signals are independently supplied to the first imaging element 11 and the second imaging element 12 by a plurality of oscillators. Further, since the wiring layout can be simplified, it is possible to reduce noise due to interference of clock signals, for example.

Furthermore, in the camera system 100 according to the present embodiment, the controller 40, the first imaging element 11, and the second imaging element 12 are connected to each other via the I²C standard serial bus. Therefore, it is possible to connect the controller 40 and the imaging element 10 in a communicable manner with a single signal line, and it is possible to reduce the number of wirings and also to send the drive signal for controlling the imaging element 10 and the image signal (having the image data) output from the imaging element 10 with the same signal line.

Further, since the number of wirings can be reduced as described above, the overall size of the camera system 100 can be reduced. Since the camera system 100 is often attached to a windshield in front of the vehicle, visibility in front of the vehicle can be improved by reducing the overall size of the system 100.

Since mutual communication between the controller 40, the first imaging element 11 and the second imaging element 12 is executed via the serial bus, at least one of the controller 40, the first imaging element 11 and the second imaging element 12 may be set as a master, or another block (not shown) in the same bus may be set as a master, and a block other than the master may be set as a slave, so that the system is operated.

The master block outputs a synchronization signal and the slave synchronizes the clock based on the synchronization signal issued by the master. As a result, synchronization between the first imaging element 11 and the second imaging element 12 is realized, and simultaneity can be secured between the two imaging elements 10 as described above. In addition, since these synchronization signals can be transmitted via the serial bus, the number of wirings can be reduced, and as a result, it is possible to simplify the wiring layout and reduce noise caused by interference of the clock signals.

In particular, in the case where the block other than the controller 40 is the master, the controller 40 detects and feeds back the synchronization shift between the first imaging element 11 and the second imaging element 12 and controls to minimize the synchronization shift therebetween. Synchronization shift is caused, for example, by delay due to communication length or noise. With respect to such synchronization shift, for example, the controller 40 corrects the start time of read-out of either one of the first imaging element 11 and the second imaging element 12 by delaying or fastening the start time by the synchronization shift. Thereby, the first region R1 and the second region R2 can be synchronized more accurately.

Second Embodiment

Figure 4:
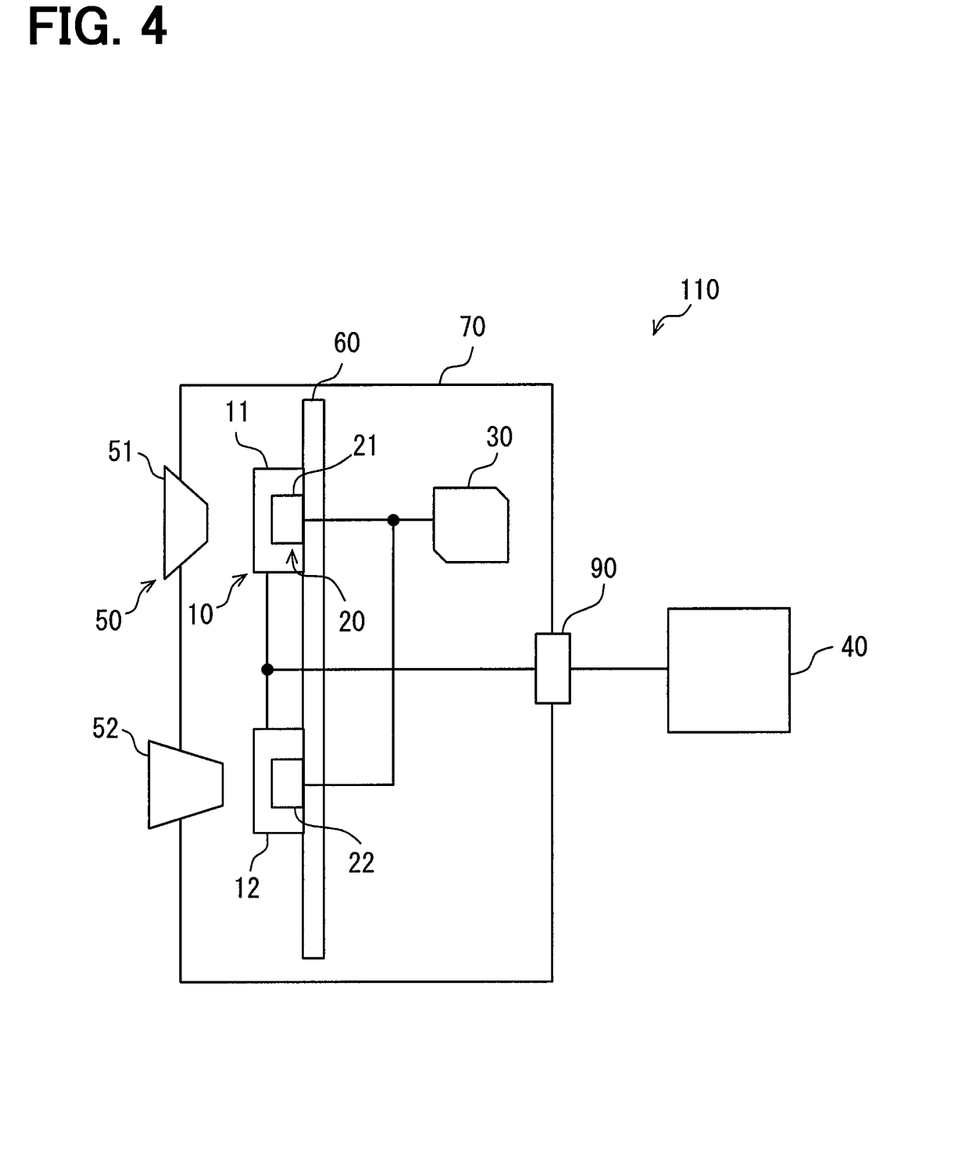
FIG. 4 is a block diagram showing a schematic configuration of a camera system according to a second embodiment.

As shown in FIG. 4, the camera module 70 in which the imaging element 10 and the lens 50 are assembled, and the controller 40 may be arranged separately. That is, the camera system 110 according to the present embodiment includes a camera module 70 and a controller 40. The camera module 70 includes the imaging element 10, the phase synchronization circuit or the PLL 20, the oscillator 30, and the lens 50. The first imaging element 11 and the second imaging element 12 are connected communicably with each other through a serial bus as in the first embodiment. In addition, the oscillator 30 supplies a common clock signal to the first imaging element 11 and the second imaging element 12.

The serial bus connecting the first imaging element 11 and the second imaging element 12 to each other is drawn to the outside of the camera module 70 and is connected to the controller 40 via the connector 90.

That is, the controller 40 is connected to the first imaging element 11 and the second imaging element 12 via a serial bus. Therefore, the controller 40 can execute the serial communication using the same bus to transmit both the driving signal and the image signal. In other words, since the image signal can be transmitted and received as the back channel using the single bus together with the driving signal, the number of wirings can be reduced, and as a result, the noise due to simplification of wiring layout and interference of clock signals can be reduced.

Ethernet (registered trademark) by a local area network (LAN), for example, may be used as a means for connecting the controller 40 and the camera module 70 so that they can communicate with each other.

Third Embodiment

Figure 5:
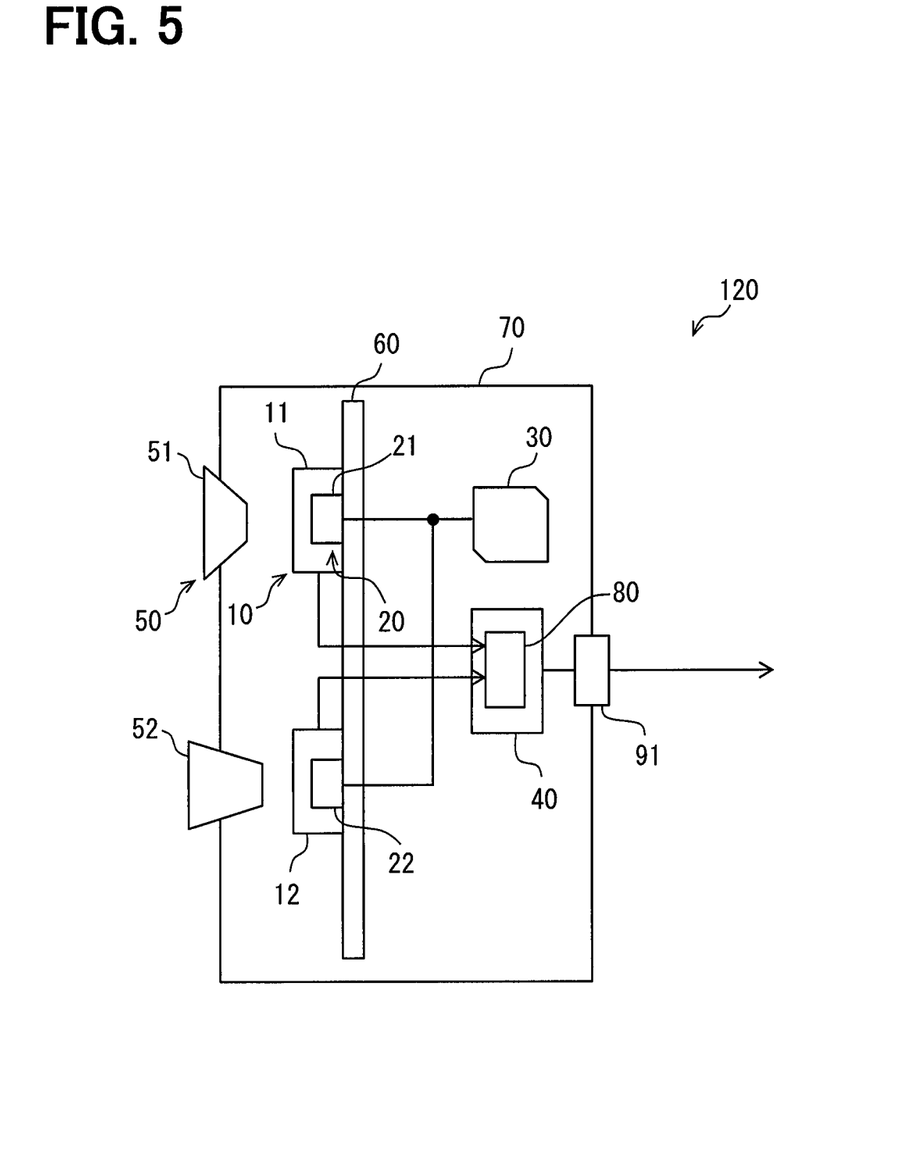
FIG. 5 is a block diagram showing a schematic configuration of a camera 10 system according to a third embodiment.

As shown in FIG. 5, in the camera system 120 according to the present embodiment, the controller 40 has a serializer 80. As a result, the image data obtained by the first imaging element 11 and the second imaging element 12 is input to the serializer 80 in the controller 40 and then the serializer 80 outputs to the outside of the system. The controller 40 in the present embodiment is an example incorporated in the camera module 70 as elements including a recognition processing IC and a serializer IC, so that, for example, the controller 40, i.e., these ICs are mounted on a board to be assembled in the camera module 70. The camera module 70 may include the controller 40, which controls the driving operation of the imaging element 10 and performs image recognition processing, and the serializer 80 as independent ICs.

The serializer 80 converts, for example, 8-bit parallel data included in the image data into serial data that can be transmitted by one serial bus, and outputs it to the outside via the connector 91. At that time, image data corresponding to one frame obtained by the first imaging element 11 and image data of the second imaging element 12 obtained by being synchronized with the first imaging element 11 are serially transmitted as a data set. As a result, the synchronized image data of the first region R1 and the second region R2 can be output to the outside while maintaining synchronization. The serialized image data is parallelized by a deserializer (not shown) installed outside the camera system 120, and is processed by, for example, an external GPU or the like.

In this way, when it is necessary to output an image to an image processing apparatus such as a GPU or the like arranged outside of the system 120, a serializer 80 may be provided to serially transmit the synchronized image data as a set. It is to be noted that the transmission manner of image data captured by the first imaging element 11 and the second imaging element 12 for transmitting as a set is not limited to a specific one. For example, the data obtained by the first imaging element 11 may be transmitted first, and then the data obtained by the second imaging element 12 may be transmitted. Alternatively, data corresponding to one line obtained by the first imaging element 11 may be alternately transmitted.

Fourth Embodiment

In each of the embodiments described above, the camera systems 100, 110, and 120 having two imaging elements 11 and 12 as the imaging element 10 and the lenses 51 and 52 corresponding to the two imaging elements 11 and 12, respectively. Alternatively, the number of imaging elements 10 in the camera system may not be limited to two.

Figure 6:
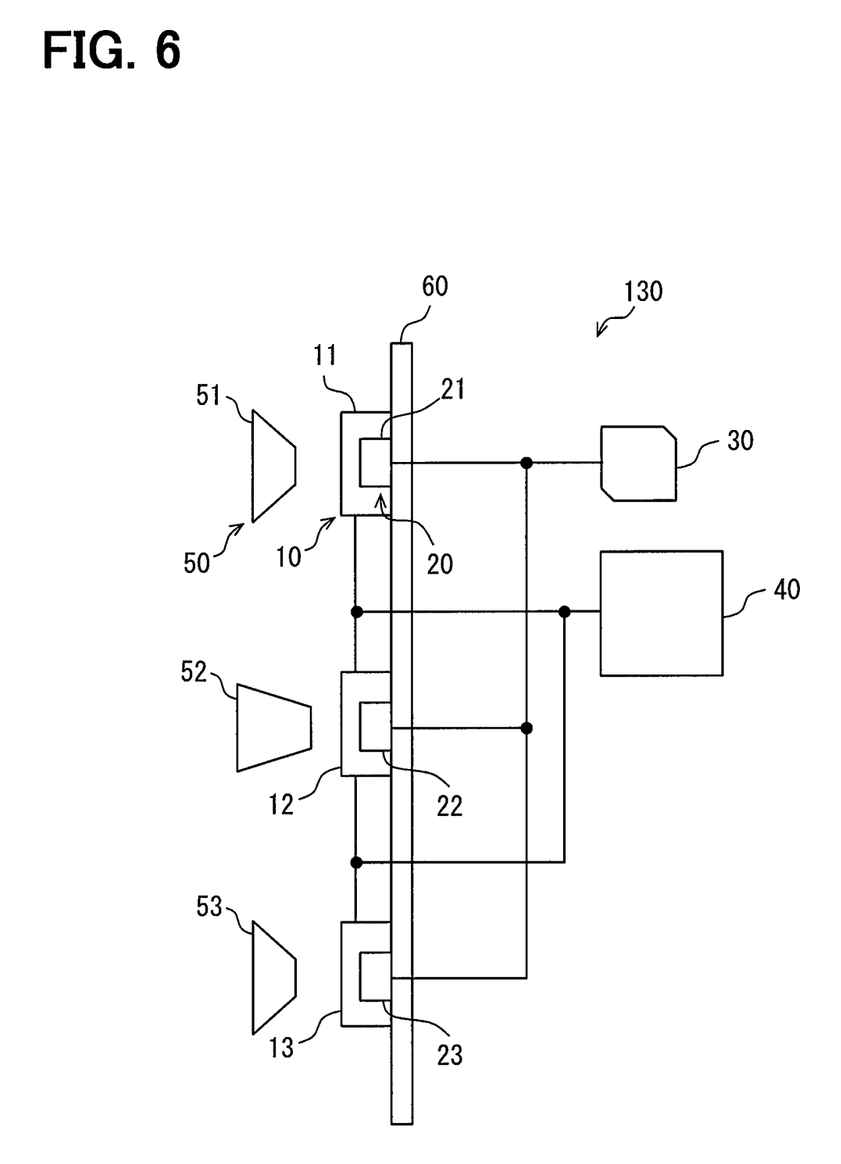
FIG. 6 is a block diagram showing a schematic configuration of a camera system according to a fourth embodiment.

As shown in FIG. 6, in the camera system 130 according to the present embodiment, in addition to the first imaging element 11 and the second imaging element 12, a third imaging element 13 and a third lens 53 are arranged. The third lens 53 collects the external light on the third imaging element 13, and the third lens 53 forms an image on the third imaging element 13. A third PLL 23 which is a corresponding phase synchronization circuit 20 is formed in the third imaging element 13, and the oscillator 30 is also connected to the third PLL 23 and outputs a clock signal thereto. That is, the first PLL 21, the second PLL 22, and the third PLL 23 receive a common clock signal from the common oscillator 30.

In addition, the first imaging element 11, the second imaging element 12, the third imaging element 13, and the controller 40 are mutually connected via, for example, a serial bus according to the I²C standard. As a result, as in the first to third embodiments, it is possible to mutually transmit and receive drive signals of the imaging element 10 and image signals such as image data with a single wire.

Here, the pixel specification of the third imaging element 13 may be different from or the same as that of the first imaging element 11 and the second imaging element 12. As an example, both the first imaging element 11, the second imaging element 12 and the third imaging element 13 have the same pixel specifications, the first lens 51 is a wide-angle lens, the second lens 52 is a standard lens, the third lens 53 is a telephoto lens, so that the resolution on the telephoto image side may be higher.

For example, it is assumed that the view angle captured by the third imaging element 13 is the view angle corresponding to the predetermined third region around the center of the effective pixel region of the second imaging element 12. The effective pixel region of the third imaging element 13 is referred to as a fourth area. The number of read-out lines of the third area is defined as N3, and the number of read-out lines of the fourth area is defined as N4. It is preferable that the read-out speed of the third imaging element 13 may be N4/N3 times larger than the read-out speed of the second imaging element 12. In addition, by simultaneously setting the start time of the red-out in the third region and the start time of the read-out in the fourth region, and by simultaneously setting the end time of the read-out in the third region and the end time of the read-out in the fourth region, respectively, the concurrency can be ensured in acquisition of image data of the third region and the fourth region.

As exemplified in the first to third embodiments, as long as simultaneity of the first region R1 and the second region R2 is secured, by adopting the aspect of the present embodiment, the first to third imaging elements are synchronized with each other to acquire image data.

Further, for example, when the focal length of the first lens 51 is the same as the third lens 53, by using the image data obtained by the first imaging element 11 and the image data obtained by the third imaging element 13, it is possible to analyze obstacles and the like using the high resolution telephoto image data obtained by the second imaging element 12 while performing the distance analysis using the parallax.

Other Embodiments

The disclosure in this specification and drawings etc. is not limited to the exemplified embodiment. The disclosure encompasses the exemplified embodiments and modifications by those skilled in the art based thereon. For example, the disclosure is not limited to the parts and/or combinations of elements shown in the embodiments. Disclosure can be implemented in various combinations. The disclosure may have additional parts that may be added to the embodiment. The disclosure encompasses omissions of parts and/or elements of the embodiments. The disclosure encompasses replacement or combination of parts and/or elements between one embodiment and another. The disclosed technical scope is not limited to the description of the embodiment.

In each of the embodiments described above, two or three imaging elements 10 are mounted on the circuit board 60. Alternatively, the number of imaging elements 10 to be mounted is not limited. In the camera system having two or more imaging elements 10, the technical idea of the present disclosure can be adopted.

In each of the embodiments described above, the example in which the plurality of imaging elements 10 have the same pixel specifications has been described. Alternatively, the plurality of imaging elements 10 may have different pixel specifications, respectively. Alternatively, the size of the package and the like may be any. As described in the first embodiment, for example, in a camera system, the focal length of the corresponding lens 50 is intentionally different from each other and both the wide angle image data and the telephoto image data are obtained by the plurality of imaging elements 10, respectively. In this system, the pixel specification of the imaging element 10 may be determined so that the number of pixels in the V direction of the telephoto image is larger than the number of pixels in the V direction when the vicinity of the center of the wide angle image is trimmed. As a result, since the pixel on the telephoto image side can be obtained with higher resolution, the analysis accuracy on the telephoto image side can be improved.

In each of the embodiments described above, the embodiment in which the first imaging element 11 and the second imaging element 12 are mounted on the same circuit board 60 is described. Alternatively, the one imaging element may be mounted on one circuit board.

In the third embodiment, the controller 40 includes the recognition processing IC and the serializer IC. Alternatively, the controller 40 controlling the driving of the imaging element 10 and performing a recognition process, and a serializer 80 may be arranged as separate ICs, respectively. Alternatively, the controller 40 may be configured as an integrated IC including the recognition processing function and the function of the serializer.

In addition, the bus connecting the controller 40 and the imaging element 10 to each other may not be limited to the I²C standard bus. In addition to the I²C standard, DDC (Display Data Channel), USB (Universal Serial Bus), Fiber Channel using optical fiber, etc. may be adopted as the bus.

Software stored in a tangible memory and a computer executing the software, only the software, only hardware, or combination of them may be possible to provide a method and/or function provided by the controller 40. For example, when the controller 40 is provided by an electronic circuit being hardware, it may be possible to provide by a digital circuit including multiple logic circuits or analog circuits.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A camera system comprising:
a first imaging element;
a second imaging element different from the first imaging element;
a first lens having a predetermined focal length and guiding an external light to the first imaging element;
a second lens having a focal length longer than the first lens and guiding the external light to the second imaging element;
an oscillator for supplying a clock signal to the first imaging element and the second imaging element; and
a controller that controls an operation of the first imaging element and an operation of the second imaging element, and acquires image signals outputted by the first imaging element and the second imaging element, wherein:
the controller synchronizes and outputs image data of a first region, which is a part of an effective pixel region of the first imaging element, and image data of a second region, which is a part or a whole of an effective pixel region of the second imaging element,
a view angle projected on the second region is equal to a view angle projected on the first region;
a numerical number of read-out lines in the second region is larger than a numerical number of read-out lines in the first region;
the numerical number of read-out lines in the first region is defined as N1;
the numerical number of read-out lines in the second region is defined as N2;
N1 is different from N2; and
the controller sets a read-out speed of the second region to be N2/N1 times larger than a read-out speed of the first region.

2. The camera system according to claim 1, wherein:
the oscillator supplies a common clock signal to the first imaging element and the second imaging element.

3. The camera system according to claim 1, wherein:
a start time of read-out of the first region is equal to a start time of read-out of the second region.

4. The camera system according to claim 1, wherein:
the first imaging element and the controller are communicably connected to each other via a serial bus; and
the second imaging element and the controller are communicably connected to each other via a serial bus.

5. The camera system according to claim 1, wherein:
the first imaging element and the second imaging element are connected to the controller via a common bus; and
a driving signal for controlling the first imaging element and the second imaging element and the image signals outputted by the first imaging element and the second imaging element are serially transmitted.

6. The camera system according to claim 1, wherein:
at least one of the controller, the first imaging element, and the second imaging element is a master;
the image data of the first region and the image data of the second region are synchronously outputted; and
when the first imaging element or the second imaging element is a master, the controller outputs a correction signal for correcting a synchronization deviation.

7. The camera system according to claim 1, wherein:
the controller superimposes or synthesizes the image signal of the first region and the image signal of the second region, and outputs a superimposed or synthesized image signal for each frame.

8. The camera system according to claim 1, wherein:
the first imaging element and the second imaging element are mounted on a same circuit board so as to face a same direction.

9. The camera system according to claim 1, further comprising:
at least one or more imaging element; and
a plurality of lenses corresponding to each imaging element.

* * * * *